(12) United States Patent
Nishihara et al.

(10) Patent No.: US 12,288,430 B2
(45) Date of Patent: Apr. 29, 2025

(54) INFORMATION PROCESSING DEVICE

(71) Applicant: SHIMANO Inc., Sakai (JP)

(72) Inventors: Taihei Nishihara, Sakai (JP); Takeshi Kuroiwa, Sakai (JP); Kazuhiro Takeda, Sakai (JP); Tsuyoshi Miyake, Sakai (JP); Takashi Komemushi, Sakai (JP)

(73) Assignee: Shimano Inc., Sakai (JP)

( * ) Notice: Subject to any disclaimer, the term of this patent is extended or adjusted under 35 U.S.C. 154(b) by 816 days.

(21) Appl. No.: 16/503,586

(22) Filed: Jul. 4, 2019

(65) Prior Publication Data

US 2020/0010138 A1    Jan. 9, 2020

(30) Foreign Application Priority Data

| Jul. 9, 2018 | (JP) | 2018-130244 |
| Jul. 9, 2018 | (JP) | 2018-130245 |
| Jul. 9, 2018 | (JP) | 2018-130246 |
| Dec. 18, 2018 | (JP) | 2018-236765 |

(51) Int. Cl.
| B60L 9/00 | (2019.01) |
| B62J 43/13 | (2020.01) |
| B62J 43/20 | (2020.01) |
| B62M 6/50 | (2010.01) |
| G06N 20/00 | (2019.01) |
| G07C 5/08 | (2006.01) |
| B62J 45/40 | (2020.01) |
| B62J 50/22 | (2020.01) |

(52) U.S. Cl.
CPC ............ *G07C 5/0816* (2013.01); *B62J 43/13* (2020.02); *B62J 43/20* (2020.02); *B62M 6/50* (2013.01); *G06N 20/00* (2019.01); *G07C 5/085* (2013.01); *B62J 45/40* (2020.02); *B62J 50/22* (2020.02)

(58) Field of Classification Search
CPC ....... G07C 5/0816; G07C 5/085; G06N 20/00; B62J 43/20; B62J 43/13; B62M 6/50
See application file for complete search history.

(56) References Cited

U.S. PATENT DOCUMENTS

| 6,047,230 A | 4/2000 | Spencer et al. |
| 9,975,603 B2 | 5/2018 | Bortolozzo et al. |
| 10,747,631 B2 * | 8/2020 | Hu ..................... G06F 1/263 |
| 2010/0030490 A1 | 2/2010 | Wright et al. |
| 2014/0229054 A1 | 8/2014 | Gerundt et al. |
| 2018/0046869 A1 | 2/2018 | Cordell et al. |

(Continued)

FOREIGN PATENT DOCUMENTS

| CN | 107679576 A * | 2/2018 |
| DE | 102015201932 A1 | 8/2016 |
| JP | S5985436 U | 6/1984 |

(Continued)

*Primary Examiner* — Adam M Alharbi
(74) *Attorney, Agent, or Firm* — Alleman Hall & Tuttle LLP

(57) ABSTRACT

An information processing device includes an input device and an artificial intelligence processor. First information related to a human-powered vehicle is input to the input device. The artificial intelligence processor is configured to generate second information related to at least one of deterioration, wear, and failure of an element of the human-powered vehicle from history information of the first information input to the input device.

19 Claims, 5 Drawing Sheets

(56) References Cited

U.S. PATENT DOCUMENTS

2019/0391800 A1* 12/2019 Lin ...................... H04L 67/125

FOREIGN PATENT DOCUMENTS

| JP | S60168928 A | 9/1985 |
| JP | 2000234641 A | 8/2000 |
| JP | 2006143194 A | 6/2006 |
| JP | 2008029110 A | 2/2008 |
| JP | 2010032054 A | 2/2010 |
| JP | 2014516007 A | 7/2014 |

* cited by examiner

INFORMATION PROCESSING DEVICE

BACKGROUND ART

The present invention relates to an information processing device.

Elements of a human-powered vehicle described in, for example, patent document 1 will deteriorate, wear down, or fail in accordance with the usage state and environment of the human-powered vehicle. For example, brake pads described in patent document 1 will be worn down by actuation of the brakes.

Patent Document 1: Japanese Laid-Open Patent Publication No. 2006-143194

SUMMARY

To use the elements of the human-powered vehicle described in patent document 1, it is preferred that deterioration, wear, and failure be appropriately determined.

One object of the present invention is to provide an information processing device that appropriately determines at least one of deterioration, wear, and failure of an element.

An information processing device in accordance with a first aspect of the present disclosure comprises an input device to which first information related to a human-powered vehicle is input and an artificial intelligence processor including a processor configured to generate second information related to at least one of deterioration, wear, and failure of an element of the human-powered vehicle from history information of the first information input to the input device.

With the information processing device in accordance with the first aspect, the artificial intelligence processor determines at least one of deterioration, wear, and failure of the element in a preferred manner.

In accordance with a second aspect of the present disclosure, the information processing device according to the first aspect further comprises a notification device configured to issue a notification of the second information.

With the information processing device in accordance with the second aspect, the notification device allows a user to recognize at least one of deterioration, wear, and failure of an element.

In accordance with a third aspect of the present disclosure, the information processing device according to the second aspect is configured so that in a case where the artificial intelligence processor determines that the element has entered a first deterioration state or a first wear state, the notification device issues the notification of the second information.

With the information processing device in accordance with the third aspect, the notification device allows a user to recognize that the element is in the first deterioration state or the first wear state.

In accordance with a fourth aspect of the present disclosure, the information processing device according to any one of the first to third aspects is configured so that the second information includes information prompting at least one of replacement of the element and maintenance of the element.

With the information processing device in accordance with the fourth aspect, the user can perform at least one of replacement of the element and maintenance on the element in a preferred manner.

In accordance with a fifth aspect of the present disclosure, the information processing device according to any one of the first to fourth aspects is configured so that the second information includes information related to an appropriate period for performing at least one of replacement of the element and maintenance on the element.

With the information processing device in accordance with the fifth aspect, the user can perform at least one of replacement of the element and maintenance on the element at an appropriate period.

In accordance with a sixth aspect of the present disclosure, the information processing device according to any one of the first to fifth aspects is configured so that the history information includes information related to a change in the first information and information related to at least one of usage frequency of the element and usage time of the element.

With the information processing device in accordance with the sixth aspect, the second information is generated in accordance with the information related to a change in the first information and the information related to at least one of the usage frequency of the element and the usage time of the element.

In accordance with a seventh aspect of the present disclosure, the information processing device according to any one of the first to sixth aspects is configured so that the element includes at least one of a brake device, a brake pad, a brake shoe, a hose, a disc brake rotor, oil, grease, a cable, a sprocket, a chain, a lamp, a transmission, an operation device, a wheel, a hub, a rim, a spoke, a tire, a bottom bracket, a crankshaft, a crank arm, a pedal, a handle grip, a generator, a suspension, an adjustable seatpost, a battery, and a drive device applying propulsion force to the human-powered vehicle.

With the information processing device in accordance with the seventh aspect, the artificial intelligence processor can determine in a preferred manner at least one of deterioration, wear, and failure of at least one of the brake device, the brake pad, the brake shoe, the hose, the disc brake rotor, the oil, the grease, the cable, the sprocket, the chain, the lamp, the transmission, the operation device, the wheel, the hub, the rim, the spoke, the tire, the bottom bracket, the crankshaft, the crank arm, the pedal, the handle grip, the generator, the suspension, the adjustable seatpost, the battery, and the drive device assisting propulsion of the human-powered vehicle.

In accordance with an eighth aspect of the present disclosure, the information processing device according to any one of the first to fifth aspects is configured so that the element is included in the brake device and includes a friction member to brake the human-powered vehicle, and the first information includes information related to a braking distance of the human-powered vehicle.

With the information processing device in accordance with the eighth aspect, at least one of deterioration, wear, and failure of a friction member included in the brake device can be determined in a preferred manner from the information related to the braking distance of the human-powered vehicle.

In accordance with a ninth aspect of the present disclosure, the information processing device according to the eighth aspect is configured so that the friction member includes at least one of a brake pad and a brake shoe.

With the information processing device in accordance with the ninth aspect, at least one of deterioration, wear, and failure of the brake pad and the brake shoe can be determined in a preferred manner from the information related to the braking distance of the human-powered vehicle.

In accordance with a tenth aspect of the present disclosure, the information processing device according to the eighth or ninth aspect is configured so that the first information includes information related to operation of the friction member and information related to at least one of deceleration of the human-powered vehicle, position of the human-powered vehicle, and speed of the human-powered vehicle.

With the information processing device in accordance with the tenth aspect, at least one of deterioration, wear, and failure of the friction member can be determined in a preferred manner from at least one of the information related to the operation of the friction member, the deceleration of the human-powered vehicle, the position of the human-powered vehicle, and the speed of the human-powered vehicle.

In accordance with an eleventh aspect of the present disclosure, the information processing device according to the tenth aspect further comprises a first detector configured to detect operation of the friction member and a second detector configured to detect at least one of deceleration of the human-powered vehicle, position of the human-powered vehicle, and speed of the human-powered vehicle.

With the information processing device in accordance with the eleventh aspect, the first detector detects operation of the friction member in a preferred manner. The second detector detects at least one of deceleration of the human-powered vehicle, position of the human-powered vehicle, and speed of the human-powered vehicle in a preferred manner.

In accordance with a twelfth aspect of the present disclosure, the information processing device according to the eleventh aspect is configured so that the first detector is provided on at least one of an operation device for operating the friction member, a cable for operating the friction member, and a hose for operating the friction member. The first detector is configured to output a signal corresponding to a force input to the operation device.

With the information processing device in accordance with the twelfth aspect, the first detector detects a signal corresponding to the force input to the operation device in a preferred manner.

In accordance with a thirteenth aspect of the present disclosure, the information processing device according to the eighth or ninth aspect is configured so that the first information includes information related to a state of the friction member and information related to at least one of deceleration of the human-powered vehicle, position of the human-powered vehicle, and speed of the human-powered vehicle.

With the information processing device in accordance with the thirteenth aspect, at least one of deterioration, wear, and failure of the element can be determined in a preferred manner from the information related to the state of the friction member and the information related to at least one of the deceleration of the human-powered vehicle, the position of the human-powered vehicle, and the speed of the human-powered vehicle.

In accordance with a fourteenth aspect of the present disclosure, the information processing device according to the thirteenth aspect further comprises a third detector configured to detect contact of the friction member with a braking subject and a fourth detector configured to detect at least one of the deceleration of the human-powered vehicle, the position of the human-powered vehicle, and the speed of the human-powered vehicle.

With the information processing device in accordance with the fourteenth aspect, the third detector detects contact of the friction member with a braking subject. The fourth detector allows for detection of at least one of deceleration of the human-powered vehicle, position of the human-powered vehicle, and speed of the human-powered vehicle in a preferred manner.

In accordance with a fifteenth aspect of the present disclosure, the information processing device according to the eighth or ninth aspect is configured so that the element is included in the brake device and includes a friction member to brake the human-powered vehicle, the friction member is configured to be movable between an initial position where the friction member is separated from the braking subject and a contact position where the friction member can contact the braking subject, and the first information includes the initial position and the contact position.

With the information processing device in accordance with the fifteenth aspect, at least one of deterioration, wear, and failure of the element can be determined in a preferred manner from the information related to the initial position and contact position.

In accordance with a sixteenth aspect of the present disclosure, the information processing device according to the fifteenth aspect further includes a fifth detector that detects the initial position and the contact position.

With the information processing device in accordance with the sixteenth aspect, the fifth detector detects the initial position and the contact position in a preferred manner.

In accordance with a seventeenth aspect of the present disclosure, the information processing device according to any one of the first to sixteenth aspects is configured so that the first information includes information related to a usage environment of the element.

With the information processing device in accordance with the seventeenth aspect, at least one of deterioration, wear, and failure of the element can be determined in a preferred manner from the information related to the usage environment of the element.

In accordance with an eighteenth aspect of the present disclosure, the information processing device according to any one of the first to seventeenth aspects further comprises a controller configured to control at least one of a human-powered vehicle component that includes the element and a human-powered vehicle component that does not include the element in accordance with the second information.

With the information processing device in accordance with the eighteenth aspect, at least one of a human-powered vehicle component that includes the element and a human-powered vehicle component that does not include the element can be controlled in a preferred manner in accordance with the second information.

In accordance with a nineteenth aspect of the present disclosure, the information processing device according to the eighteenth aspect is configured so that the human-powered vehicle component includes at least one of a transmission and a drive device that applies propulsion force to the human-powered vehicle.

With the information processing device in accordance with the nineteenth aspect, at least one of the transmission and the drive device, which applies propulsion force to the human-powered vehicle, can be controlled in accordance with the second information in a preferred manner.

In accordance with a twentieth aspect of the present disclosure, the information processing device according to the eighteenth or nineteenth aspect is configured so that the controller controls at least one of the element and the human-powered vehicle component in a first control state and a second control state in which usage frequency and actuation strength of the at least one of the element and the human-powered vehicle component is decreased from that of the first control state. In a case where the artificial intelligence processor determines that the element has entered a second deterioration state or a second wear state, the controller shifts from the first control state to the second control state.

With the information processing device in accordance with the twentieth aspect, at least one of the element and the human-powered vehicle component is controlled in the second state in a case where the artificial intelligence processor determines that the element is in the second deterioration state or the second wear state.

The information processing device in accordance with the present disclosure appropriately determines at least one of deterioration, wear, and failure of an element.

EMBODIMENTS OF THE INVENTION

Figure 1:
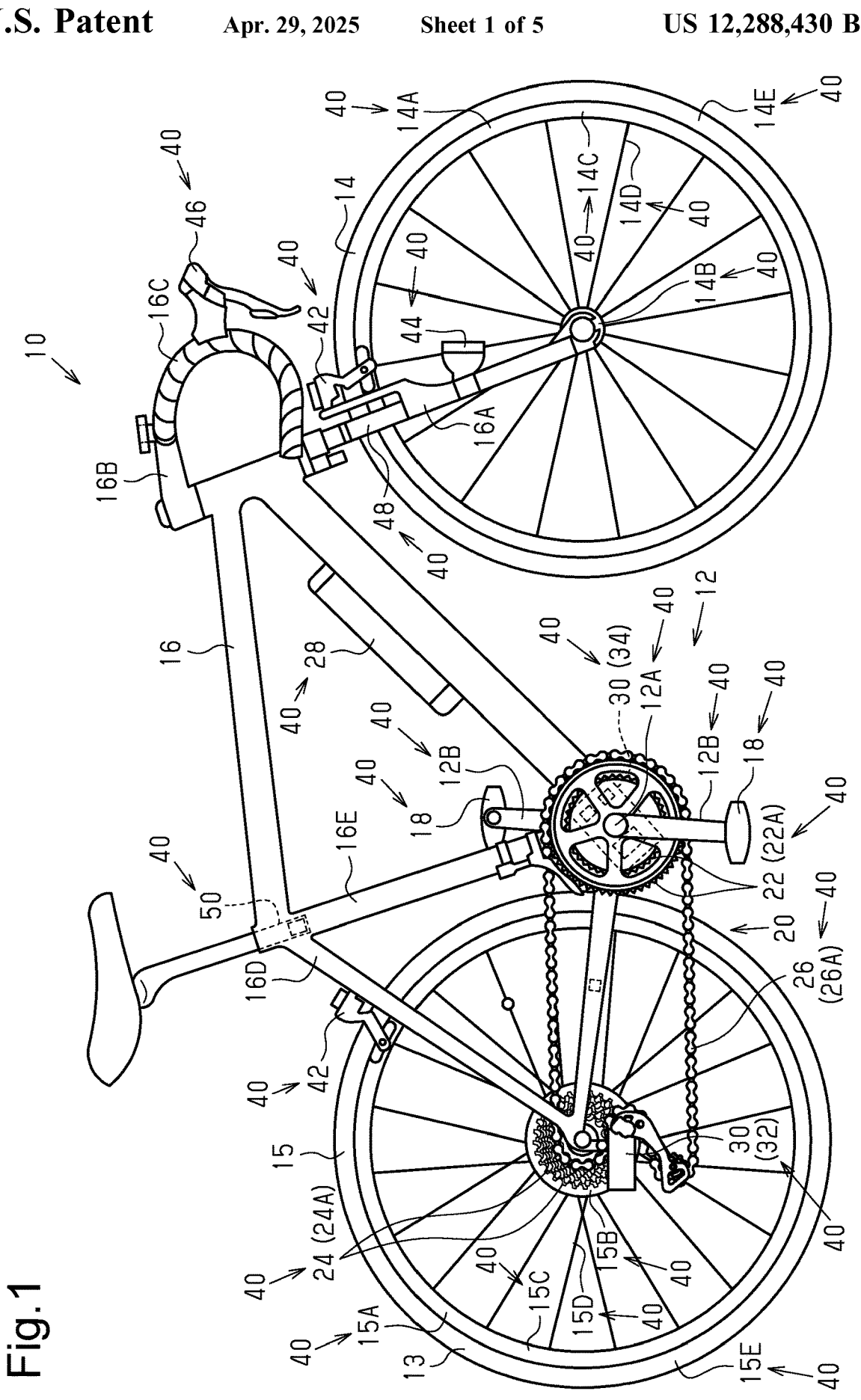
FIG. 1 is a side view of a human-powered vehicle including an information processing device in accordance with one embodiment.
Figure 2:
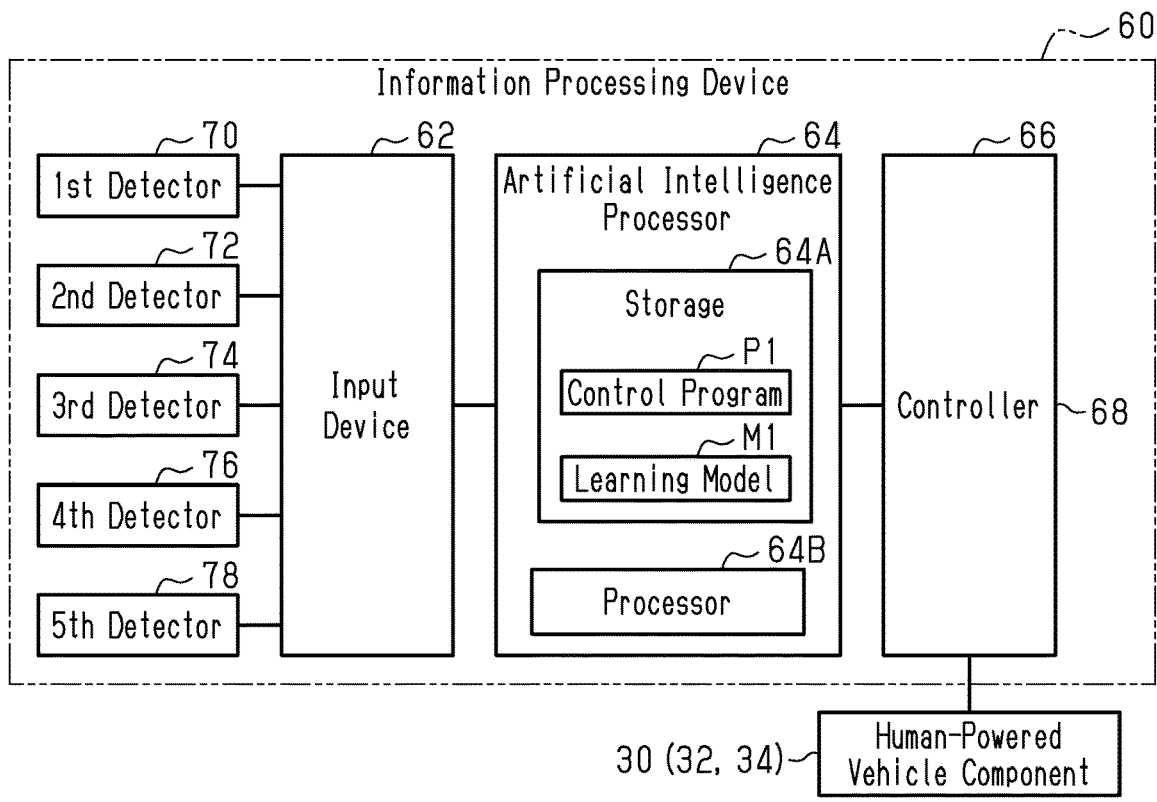
FIG. 2 is a block diagram showing the electrical configuration of the information processing device in accordance with the embodiment.
Figure 3:
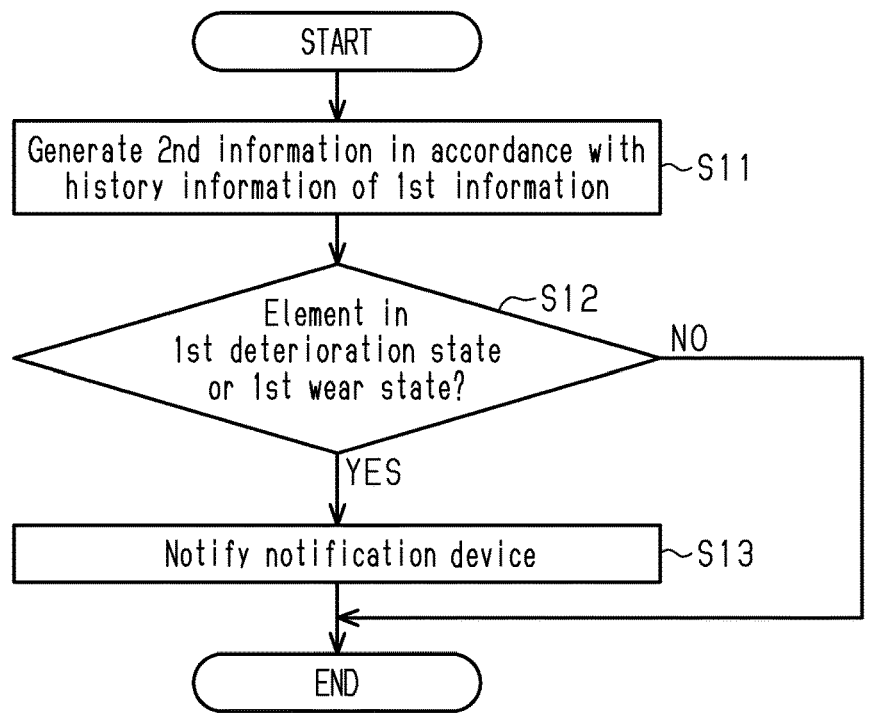
FIG. 3 is a flowchart of a process for generating second information executed by an artificial intelligence processor shown in FIG. 2.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Embodiment

An information processing device 60 in accordance with one embodiment will now be described with reference to FIGS. 1 to 6. The information processing device 60 is for use with a human-powered vehicle 10. The human-powered vehicle 10 is a vehicle driven by at least human driving force. The human-powered vehicle 10 includes, for example, a bicycle. The number of wheels of the human-powered vehicle 10 is not limited, and the human-powered vehicle 10 includes, for example, vehicles including one wheel and vehicles including three or more wheels. The human-powered vehicle 10 includes, for example, various types of bicycles such as a mountain bike, a road bike, a city bike, a cargo bike, a recumbent bike, and an electric bike (E-bike). An electric bike includes an electric assist bicycle that assists propulsion of the vehicle with an electric motor. The human-powered vehicle 10 will be referred to as a bicycle in the embodiment described hereafter.

The human-powered vehicle 10 includes a crank 12 and a drive wheel 13. The human-powered vehicle 10 further includes a frame 16. Human driving force is input to the crank 12. The crank 12 includes a crankshaft 12A, which is rotatable relative to the frame 16, and crank arms 12B, which are respectively provided on the axial ends of the crankshaft 12A. A pedal 18 is coupled to each crank arm 12B. The crank 12 is rotated to drive the drive wheel 13. The drive wheel 13 is supported by the frame 16. A drive mechanism 20 links the crank 12 and the drive wheel 13. The drive mechanism 20 includes a first rotation body 22 coupled to the crankshaft 12A. The crankshaft 12A and the first rotation body 22 can be coupled by a first one-way clutch. The first one-way clutch is configured to rotate the first rotation body 22 forward if the crank 12 rotates forward and not to rotate the first rotation body 22 backward if the crank 12 rotates backward. The first rotation body 22 includes a sprocket 22A, a pulley, or a bevel gear. The drive mechanism 20 further includes a second rotation body 24 and a linking member 26. The linking member 26 transmits the rotation force of the first rotation body 22 to the second rotation body 24. The linking member 26 includes, for example, a chain 26A, a belt, or a shaft.

The second rotation body 24 is coupled to the drive wheel 13. The second rotation body 24 includes a sprocket 24A, a pulley, or a bevel gear. A second one-way clutch is provided between the second rotation body 24 and the drive wheel 13. The second one-way clutch is configured to rotate the drive wheel 13 forward if the second rotation body 24 rotates forward and not rotate the drive wheel 13 backward if the second rotation body 24 rotates backward.

The human-powered vehicle 10 includes a front wheel 14 and a rear wheel 15. The front wheel 14 is coupled to the frame 16 by a front fork 16A. A handlebar 16C is coupled to the front fork 16A by a stem 16B. In the embodiment described hereafter, the rear wheel 15 is the drive wheel 13. However, the front wheel 14 can be the drive wheel 13.

The front wheel 14 includes a wheel 14A and a tire 14E. The wheel 14A includes a hub 14B, a rim 14C, and spokes 14D. The rear wheel 15 includes a wheel 15A and a tire 15E. The wheel 15A includes a hub 15B, a rim 15C, and spokes 15D.

The human-powered vehicle 10 further includes a battery 28. The battery 28 includes one or more battery cells. The battery cells include rechargeable batteries. The battery 28 is provided on the human-powered vehicle 10 to supply electric power to other electric components electrically connected by wires to the battery 28, such as the information processing device 60 and a human-powered vehicle component 30. The battery 28 is connected to the information processing device 60 and the human-powered vehicle component 30 in a manner allowing for wired communication or wireless communication. The battery 28 is configured to communicate with the information processing device and the human-powered vehicle component 30 through, for example, power line communication (PLC). The battery 28 can be coupled to the outside of the frame 16 or be at least partially accommodated inside the frame 16. The battery 28 can be provided on at least one of the information processing device 60 and the human-powered vehicle component 30.

The human-powered vehicle 10 further includes the human-powered vehicle component 30. The human-powered vehicle component 30 includes at least one of a transmission 32 and a drive device 34 that applies propulsion force to the human-powered vehicle 10.

The transmission 32 is configured to change, in steps, the ratio of the rotational speed of the drive wheel 13 to the rotational speed of the rotation body to which human driving force is input. The rotation body to which the human driving force is input includes the crank 12. The transmission 32 is configured to be driven by an electric actuator. The electric actuator includes an electric motor. The transmission 32 is used to change a ratio of the rotational speed of the drive wheel 13 to the rotational speed of the crank 12. In the present embodiment, the transmission 32 is configured to change the ratio in steps. The electric actuator has the transmission 32 perform a shifting action. The electric actuator is connected to the information processing device 60 in a manner allowing for wired communication or wireless communication. The electric actuator is configured to communicate with the artificial intelligence processor 64 through power line communication (PLC). The electric actuator has the transmission 32 perform a shift action in accordance with a control signal from the information processing device 60. The transmission 32 includes at least one of an internal geared hub and an external shifting device (derailleur).

The drive device 34 includes a motor and a drive circuit. Preferably, the motor is provided on the same housing as the drive circuit. The drive circuit controls the electric power supplied from the battery 28 to the motor. The drive circuit is connected to the information processing device 60 in a manner allowing for wired communication or wireless communication. The drive circuit is configured to communicate with the information processing device 60 through, for example, serial communication. The drive circuit drives the motor in accordance with a control signal from the information processing device 60. The motor includes an electric motor. The motor is provided to transmit rotation to the front wheel or a transmission path extending from the pedals 18 to the rear wheel 15. The motor is provided on the frame 16 of the human-powered vehicle 10, the rear wheel 15, or the front wheel 14. In one example, the motor is coupled to a power transmission path extending from the crankshaft 12A to the first rotation body 22. Preferably, a one-way clutch is provided in a power transmission path extending between the motor and the crankshaft 12A so that the rotation force of the crank 12 does not rotate the motor in a case where the crankshaft 12A is rotated in a direction moving the human-powered vehicle 10 forward. A component that differs from the motor and the drive circuit, such as a reduction gear that reduces the speed of the rotation produced by the motor and outputs the rotation, can be provided on the housing on which the motor and the drive circuit are provided.

The information processing device 60 includes an input device 62, to which first information related to the human-powered vehicle 10 is input, and the artificial intelligence processor 64. The artificial intelligence processor 64 is configured to generate second information related to at least one of deterioration, wear, and failure of an element 40 of the human-powered vehicle 10 from history information of the first information input to the input device 62.

The artificial intelligence processor 64 can be provided on the human-powered vehicle 10 or on an external device of the human-powered vehicle 10. The external device includes at least one of a cycle computer, a tablet-type computer, a smartphone, and a personal computer. Preferably, the input device 62 is provided on the same housing as the artificial intelligence processor 64.

The element 40 is a brake device 42, a brake pad 40B (refer to FIG. 5), a brake shoe, a hose 40C (refer to FIG. 5), a disc brake rotor 40D (refer to FIG. 5), oil, grease, a cable, the sprocket 22A and 24A, the chain 26A, a lamp 44, the transmission 32, an operation device 46, the wheels 14A and 15A, the hubs 14B and 15B, the rims 14C and 15C, the spokes 14D and 15D, the tires 14E and 15E, a bottom bracket, the crankshaft 12A, the crank arms 12B, the pedals 18, handle grips, a generator, a suspension 48, an adjustable seatpost 50, the battery 28, and the drive device 34 that applies propulsion force to the human-powered vehicle 10. The transmission 32 included in the element 40 can be a mechanical transmission 32 actuated by a cable. The cable is a Bowden cable.

The brake device 42 is configured to brake at least one of the front wheel 14 and the rear wheel 15. The brake device 42 can include an electric actuator. The brake device 42 can include at least one of a disc brake, a rim brake, a drum brake, or a roller brake. Further, the brake device 42 can include an electric brake to perform regenerative braking.

The lamp 44 includes at least one of a front lamp and a tail lamp. The front lamp is attached to, for example, the front fork 16A or the handlebar 16C. The tail lamp is attached to, for example, a seat stay 16D or a seatpost.

The operation device 46 is connected to another component in a manner allowing for wired communication or wireless communication. The operation device 46 is configured to operate the other component. The other component includes at least one of the human-powered vehicle component 30, the brake device 42, the lamp 44, the suspension 48, the adjustable seatpost 50, and the battery 28. The operation device 46 is configured to communicate with the other component through power line communication (PLC). The operation device 46 includes, for example, an operation member, a first detector configured to detect movement of the operation member, and an electric circuit that performs communication with the other component in accordance with an output signal of the first detector. As a user operates the operation member, the electric circuit transmits a signal in accordance with the output signal of the first detector to the other component. The operation member and the first detector detecting movement of the operation member are configured to include a push switch, a lever switch, or a touch panel. The operation device 46 is provided on, for example, the handlebar 16C. Instead of being connected to the other component in a manner allowing for communication, the operation device 46 can be mechanically connected by a cable or a hose to the other component and configured to actuate the other component.

The suspension 48 includes at least one of a rear suspension and a front suspension. The suspension 48 absorbs impact applied to a wheel. The suspension 48 can be a hydraulic suspension or an air suspension. The suspension 48 includes a first portion and a second portion fitted to the first portion and movable relative to the first portion. The suspension 48 functions in operation states including a lock state in which the suspension 48 restricts relative movement of the first portion and the second portion and an unlock state in which the suspension 48 permits relative movement of the first portion and the second portion. The suspension 48 can include an electric actuator that actuates the suspension 48. The electric actuator includes, for example, an electric motor. The electric actuator switches the operation states of the suspension 48. The lock state of the suspension 48 can include a state in which the first portion and the second portion slightly move relative to each other when a strong impact is applied to the wheel. Instead of or in addition to the lock state and unlock state, the operation states of the suspension 48 may include at least one of a plurality of operation states of different damping forces and a plurality of operation states of different stroke amounts.

The rear suspension is configured to be provided on the frame 16 of the human-powered vehicle 10. More specifically, the rear suspension is provided between the frame body of the frame 16 and a swing arm that supports the rear wheel 15. The rear suspension absorbs impact applied to the rear wheel 15. The front suspension is configured to be provided between the frame 16 of the human-powered vehicle 10 and the front wheel 14. More specifically, the front suspension is provided on the front fork 16A. The front suspension absorbs impact applied to the front wheel 14.

The adjustable seatpost 50 is provided on a seat tube 16E and configured to change the height of a saddle. The adjustable seatpost 50 includes an electric seatpost, which extends and retracts a seatpost with the force of an electric actuator, or a mechanical seatpost, which extends the seatpost with at least one of a spring and air by controlling a valve with the force of an actuator and retracts the seatpost by applying manual force. The mechanical seatpost includes a hydraulic seatpost or a hydraulic air pressure seatpost.

The artificial intelligence processor 64 includes storage 64A that stores software and a processor 64B that executes the software stored in the storage 64A to perform various functions of the artificial intelligence processor 64. The processor 64B includes, for example, a central processing unit (CPU) or a micro-processing unit (MPU). Preferably, in addition to the CPU and the MPU, the processor 64B includes a graphics processing unit (GPU). The processor 64B can include a field-programmable gate array (FPGA). The artificial intelligence processor 64 can include one or more processors 64B.

The artificial intelligence processor 64 can include a plurality of processors 64B arranged at separate positions.

The storage 64A includes, for example, a nonvolatile memory and a volatile memory. The storage 64A stores control program P1 and learning model M1. In the present embodiment, learning model M1 is a learned model learned by a predetermined learning algorithm. The learning algorithm includes machine learning, deep learning, or deep reinforcement learning. The learning algorithm includes, for example, at least one of supervised learning, unsupervised learning, and reinforcement learning. As a learning algorithm, methods other than the method described in the present specification can be used as long as it is configured to update learning model M1 using a method belonging to the field of artificial intelligence. Preferably, the learning process for updating learning model M1 is performed by the GPU. The learning algorithm can use a neural network (NN). The learning algorithm can use a recurrent neural network. The artificial intelligence processor 64 uses learning model M1 to process the first information obtained from the input device based on control program P1 and generate the second information.

Preferably, the information processing device 60 further includes a notification device 66 configured to issue a notification. The notification device 66 includes at least one of a display and a speaker. The notification device 66 can be provided on the same housing as the artificial intelligence processor 64 or on a housing that differs from that of the artificial intelligence processor 64. The notification device 66 can be included in at least one of a cycle computer, a tablet computer, a smartphone, and a personal computer.

Preferably, history information includes information related to a change in the first information and information related to at least one of the usage frequency of the element 40 and the usage time of the element 40. The first information can include information related to the usage environment of the element 40. The information related to the usage environment includes, for example, at least one of the pressure applied to the element 40 and the temperature.

Preferably, in a case where the artificial intelligence processor 64 determines that the element 40 has entered a first deterioration state or a first wear state, the notification device 66 issues a notification of the second information. In one example, the second information includes information for prompting at least one of replacement of the element 40 and maintenance of the element 40. Preferably, in this case, the first deterioration state or the first wear state is a state in which the element 40 should be replaced or undergo maintenance. The notification device 66 shows characters or icons instructing, for example, the user to replace the element 40 or clean the element 40. In a further example, the second information includes information related to the appropriate period for performing at least one of replacement of the element 40 and maintenance on the element 40. Preferably, in this case, the first deterioration state and the first wear state are states before replacement and maintenance of the element 40 become necessary. The notification device 66 shows, for example, characters instructing, for example, the user to replace the element 40 within thirty days or clean the element 40 within thirty days.

A process for generating the second information from the history information of the first information will now be described. In a case where the artificial intelligence processor 64 is supplied with electric power, the artificial intelligence processor 64 starts the process and proceeds to step S11 of the flowchart shown in FIG. 3.

In step S11, the artificial intelligence processor 64 generates the second information from the history information of the first information and then proceeds to step 12. In step S12, the artificial intelligence processor 64 determines whether or not the element 40 is in the first deterioration state or the first wear state. In a case where the element 40 is neither in the first deterioration state nor the first wear state, the artificial intelligence processor 64 proceeds to step S13.

In step S13, the artificial intelligence processor 64 notifies the notification device 66 of the second information and then ends the process. For example, the artificial intelligence processor 64 outputs a control signal to the notification device 66 to notify the notification device 66 of information corresponding to the second information. The notification device 66 issues a notification of the information corresponding to the second information.

Preferably, the information processing device 60 further includes a controller 68 configured to control at least one of a human-powered vehicle component 30 that includes the element 40 and a human-powered vehicle component 30 that does not include the element 40 in accordance with the second information. In this case, instead of or in addition to at least one of the transmission 32 and the drive device 34, the human-powered vehicle component 30 can include at least one of the brake device 42, the lamp 44, the operation device 46, the suspension 48, the adjustable seatpost 50, and the battery 28. For example, in a case where the element 40 is a friction member 40A included in the brake device 42, the human-powered vehicle component 30 that includes the element 40 is the brake device 42, and the human-powered vehicle component 30 that does not include the element 40 is a human-powered vehicle component 30 other than the brake device 42. In a case where the element 40 is, for example, in a third deterioration state or a third wear state, the controller 68 prohibits or restricts actuation of the human-powered vehicle component 30 that includes the element 40. In a case where the element 40 is, for example, in the third deterioration state or the third wear state, the controller 68 actuates the human-powered vehicle component 30 that does not include the element 40 so as to limit deterioration or wear.

The controller 68 controls at least one of the element 40 and the human-powered vehicle component 30 in a first control state and a second control state in which the usage frequency and actuation strength of the at least one of the element 40 and the human-powered vehicle component 30 is decreased from that of the first control state. In a case where the artificial intelligence processor 64 determines that the element 40 has entered a second deterioration state or a second wear state, the controller 68 can shift from the first control state to the second control state. For example, in a case where the element is the friction member 40A, the controller 68 controls the motor of the drive device 34 in the second control state so that the assist force produced by the drive device 34 in the second control state is smaller than that in the first control state. This decreases at least one of the frequency and strength of the braking performed by the brake device 42 and reduces wear of the friction member 40A.

Figure 4:
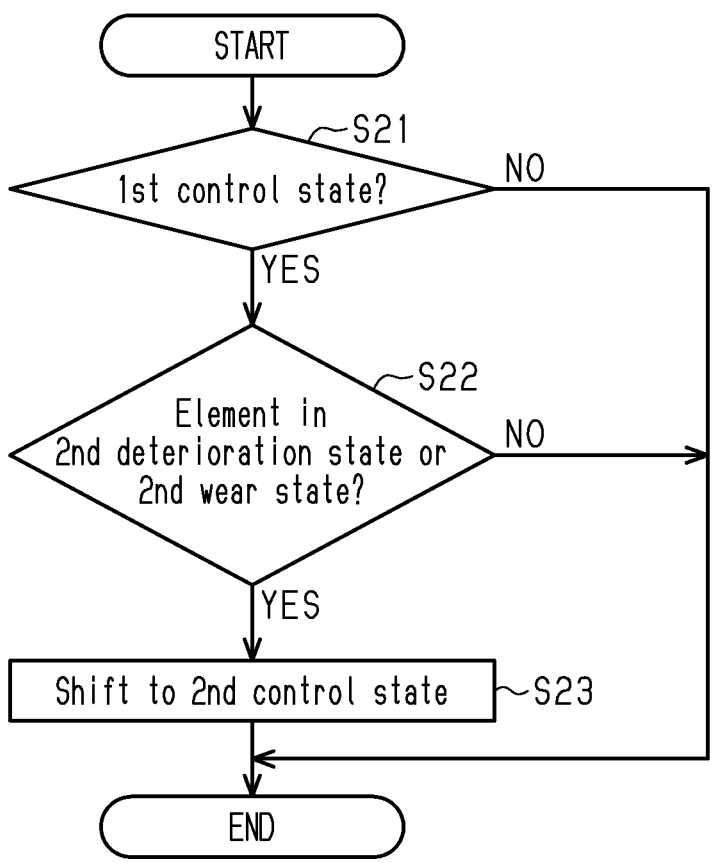
FIG. 4 is a flowchart of a process for shifting from a first control state to a second control state executed by a controller shown in FIG. 2.

With reference to FIG. 4, a process for shifting from the first control state to the second control state in accordance with the second information will now be described. In a case where the artificial intelligence processor 64 is supplied with electric power, the controller 68 starts the process and proceeds to step S21 of the flowchart shown in FIG. 4.

In step S21, the controller 68 determines whether or not the controller 68 is in the first control state. In a case where the controller 68 is not in the first control state, the controller 68 ends the process. In a case where the controller 68 is in the first control state, the controller 68 proceeds to step S22.

In step S22, the controller 68 determines whether or not the element 40 is in the second deterioration state or second wear state. In a case where the element 40 is neither in the second deterioration state nor the second wear state, the controller 68 ends the process. In a case where the element 40 is in the second deterioration state or the second wear state, the controller 68 proceeds to step S23. In step S23, the controller 68 shifts to the second control state and then ends the process. Whenever a predetermined cycle elapses after the flowchart shown in FIG. 4 is ended, the controller 68 proceeds to step S21 until the supply of electric power is stopped.

The operation device 46 and an external device or the like can be operated to shift the controller 68 from the second control state to the first control state. After the user replaces the element 40 or performs maintenance on the element, the operation device 46 and the external device or the like is operated to shift the controller 68 from the second control state to the first control state.

Figure 5:
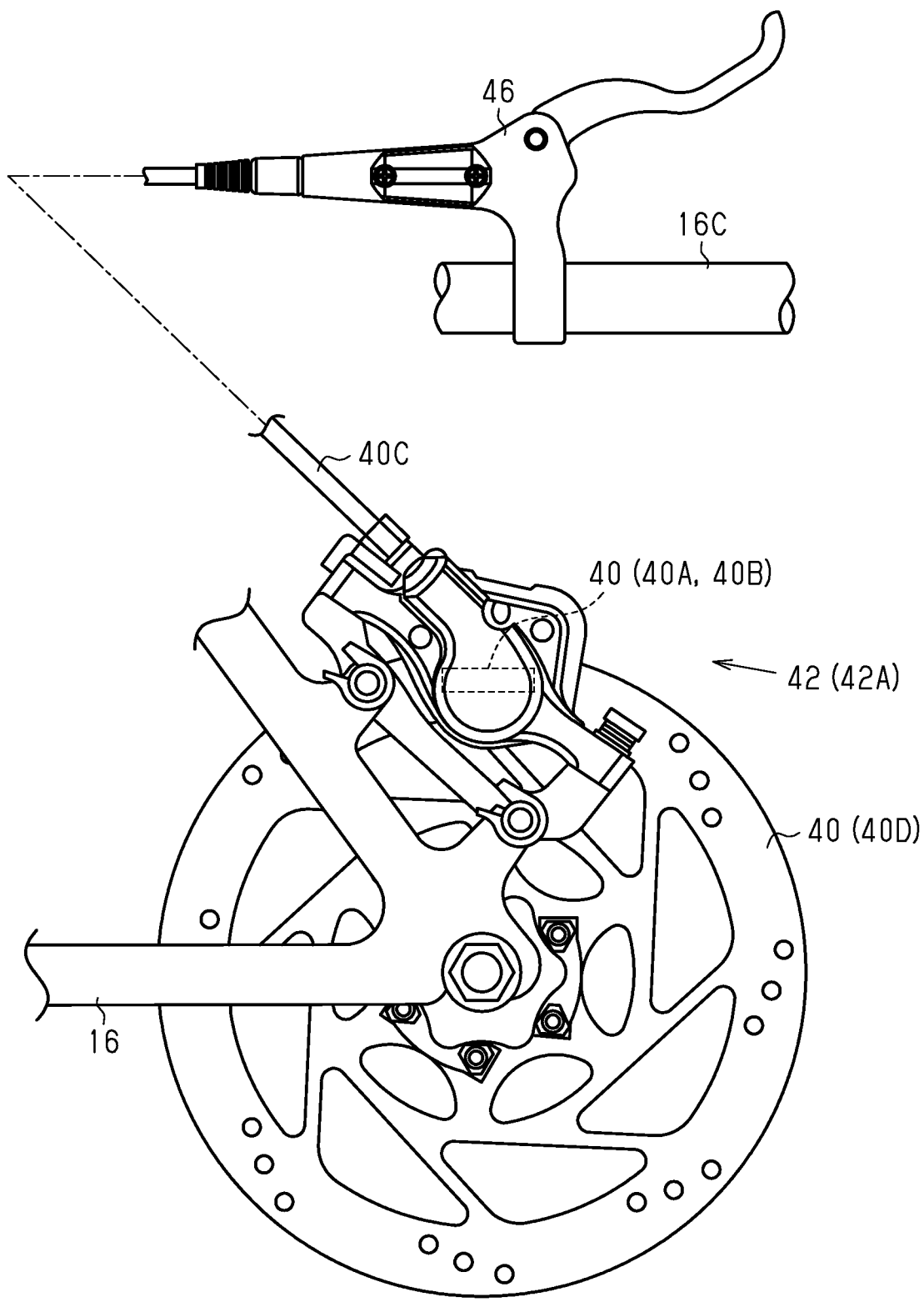
FIG. 5 is a diagram showing a disc brake system.

For example, the element 40 is included in the brake device 42 and includes the friction member 40A to brake the human-powered vehicle 10, and the first information includes information related to a braking distance of the human-powered vehicle 10. The friction member 40A includes at least one of the brake pad 40B and the brake shoe. As shown in FIG. 5, the brake device 42 includes, for example, a disc brake device 42A. The disc brake device 42A includes the brake pad 40B and the hose 40C that is connected to the operation device 46. The brake device 42 and the operation device 46 that operates the brake device 42 configure a brake system.

In a first example, the first information includes information related to at least one of the operation of the friction member 40A, deceleration of the human-powered vehicle 10, position of the human-powered vehicle 10, and speed of the human-powered vehicle 10. Preferably, in this case, the information processing device 60 further includes a first detector 70 configured to that detects operation of the friction member 40A and a second detector 72 configured to detect at least one of deceleration of the human-powered vehicle 10, position of the human-powered vehicle 10, and speed of the human-powered vehicle 10. The first detector 70 and the second detector 72 can be provided on a housing that is separate from the housing on which the artificial intelligence processor 64 is provided. Outputs of the first detector 70 and the second detector 72 are input to the input device 62. The first detector 70 and the second detector 72 can be electrically connected to the input device 62 by an electric cable or through wireless communication.

The first detector 70 is provided on at least one of the operation device 46 for operating the friction member 40A, a cable for operating the friction member 40A, and the hose 40C for operating the friction member 40A. Further, the first detector 70 is configured to output a signal corresponding to the force input to the operation device 46. The hose 40C includes a hydraulic hose.

Preferably, the second detector 72 includes at least one of a vehicle speed sensor, a crank rotation sensor, and a global positioning system (GPS) receiver.

The vehicle speed sensor is used to detect the rotational speed of a wheel of the human-powered vehicle 10. The vehicle speed sensor outputs a signal corresponding to the rotational speed of the wheel. The speed of the human-powered vehicle 10 can be calculated from the rotational speed of the wheel. Preferably, the vehicle speed sensor includes a magnetic reed, which configures a reed switch, or a Hall element. The vehicle speed sensor can be attached to a chain stay in the frame 16 of the human-powered vehicle 10 and configured to detect a magnet attached to the rear wheel 15. Alternatively, the vehicle speed sensor can be provided on the front fork 16A and configured to detect a magnet attached to the front wheel 14.

The crank rotation sensor is used to detect the rotational speed of the crank 12. The crank rotation sensor is provided on the frame 16 of the human-powered vehicle 10 or the housing on which the motor is provided. The crank rotation sensor is configured including a magnetic sensor that outputs a signal corresponding to the magnetic field intensity. An annular magnet of which the magnetic field intensity varies in the circumferential direction is provided in a power transmission path extending from the crankshaft 12A or the crankshaft 12A to the first rotation body 22. The crank rotation sensor outputs a signal corresponding to the rotational speed of the crank 12. The magnet can be provided in a member rotated integrally with the crankshaft 12A in a power transmission path of the human driving force extending from the crankshaft 12A to the first rotation body 22. For example, in a case where the first one-way clutch is not provided between the crankshaft 12A and the first rotation body 22, the magnet can be provided on the first rotation body 22. Instead of a magnetic sensor, the crank rotation sensor can include an optical sensor, an acceleration sensor, or a torque sensor.

In a second example, the first information includes information related to at least one of the state of the friction member 40A, deceleration of the human-powered vehicle 10, position of the human-powered vehicle 10, and speed of the human-powered vehicle 10. Preferably, in this case, the information processing device 60 further includes a third detector 74 configured to detect contact of the friction member 40A with a braking subject and a fourth detector 76 configured to detect at least one of deceleration of the human-powered vehicle 10, position information of the human-powered vehicle 10, and speed of the human-powered vehicle 10. The braking distance includes a movement distance of the human-powered vehicle 10 from when the brake device 42 starts braking to when the brake device 42 stops braking.

The third detector 74 is provided on at least one of the friction member 40A and the braking subject to output a signal corresponding to contact of the friction member 40A with the braking subject.

The fourth detector 76 has the same configuration as the second detector 72. The second detector 72 can be used as the fourth detector 76. However, the fourth detector 76 can be separate from the second detector 72.

The third detector 74 and the fourth detector 76 can be provided on the same housing as the artificial intelligence processor 64 or on a separate housing. The outputs of the third detector 74 and the fourth detector 76 are input to the input device 62. The third detector 74 and the fourth detector 76 can be electrically connected to the input device 62 by an electric cable or through wireless communication.

Figure 6:
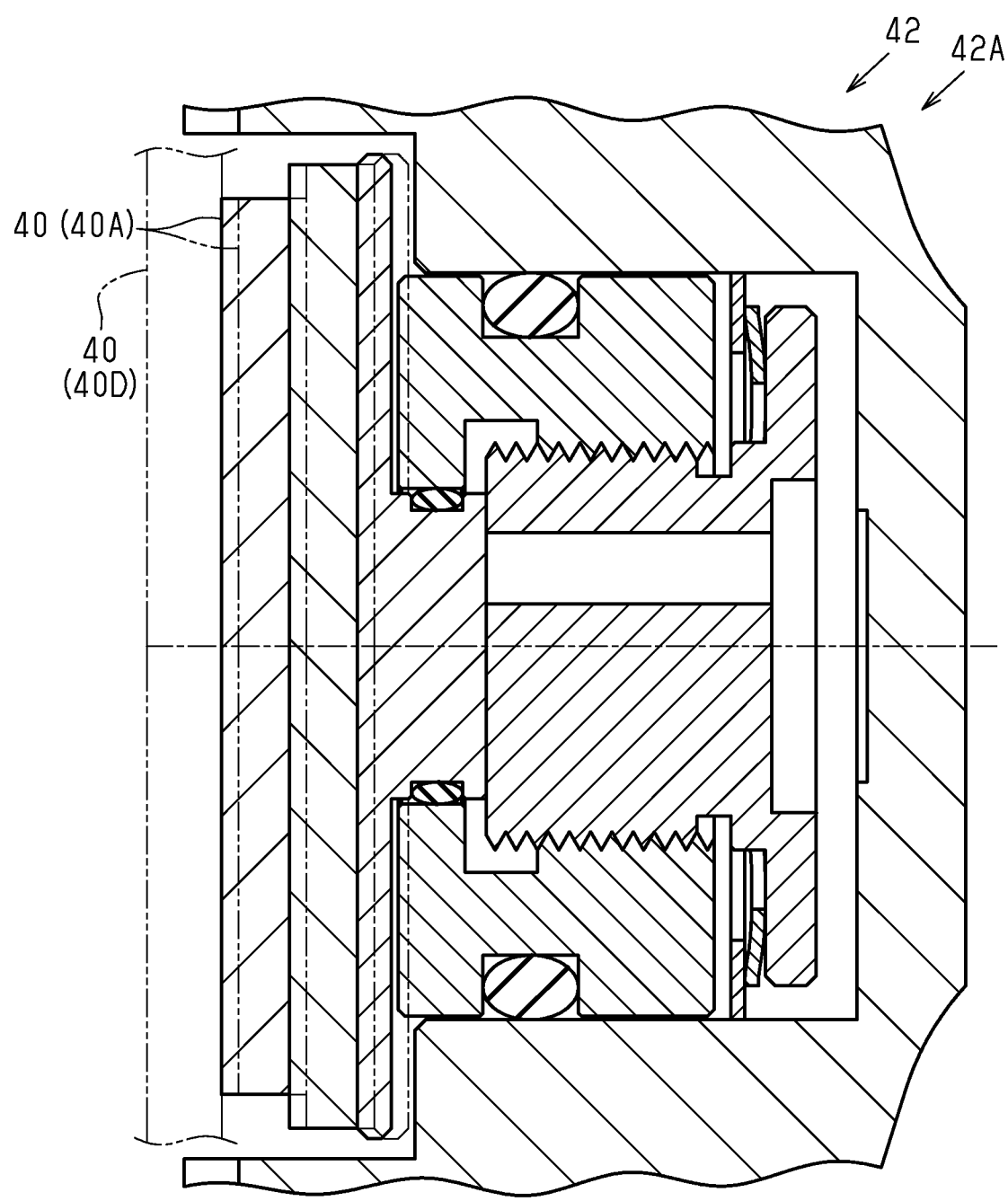
FIG. 6 is a cross-sectional view of part of a disc brake device shown in FIG. 5.

In a third example, the element 40 is included in the brake device 42 and includes the friction member 40A to brake the human-powered vehicle 10, and the friction member 40A is configured to be movable between an initial position where the friction member 40A is separated from the braking subject and a contact position where the friction member 40A can contact the braking subject. The first information includes information related to the initial position and the contact position. The double-dashed lines in FIG. 6 show the initial position of the friction member 40A in the disc brake device 42A, which is one example of the brake device 42. The solid lines in FIG. 6 show the contact position of the friction member 40A in the disc brake device 42A, which is one example of the brake device 42. The brake device 42 moves the friction member 40A toward the braking subject as operation of the operation device 46 moves hydraulic oil inside the hose 40C. The braking subject of the disc brake device 42A includes the disc brake rotor 40D. Preferably, in this case, the information processing device 60 further includes a fifth detector 78 that detects the initial position and the contact position.

The fifth detector 78 includes, for example, a linear encoder or an optical sensor. The fifth detector 78 can be provided on a housing that is separate from the housing on which the artificial intelligence processor 64 is provided. The output of the fifth detector 78 is input to the input device 62. The fifth detector 78 can be electrically connected to the input device 62 by an electric cable or through wireless communication.

In a case where the brake device 42 has a roll-back function, the distance from the friction member 40A to the braking subject at the initial position can be maintained within a predetermined range even if wear occurs in the friction member 40A. In this case, if the friction member 40A has a first surface faced toward the friction member 40A, the fifth detector can detect a change in the initial position of a second surface of the friction member 40A that is opposite to the first surface.

The second information can be generated in combination with one or two of the first example, the second example, and the third example. More specifically, the artificial intelligence processor 64 generates the second information from one or two of the first information in the first example, the first information in the second example, and the first information in the third example.

Learning model M1 can be updated by a learning program. Preferably, the learning program is stored in the storage 64A. In this case, the artificial intelligence processor 64 is operated in, for example, a learning mode and a control mode. In a case where the artificial intelligence processor 64 operates in the learning mode, the artificial intelligence processor 64 generates leaning mode M1 with a learning algorithm based on the learning program. In a case where the artificial intelligence processor 64 operates in the control mode, the artificial intelligence processor 64 processes the first information obtained from the input device 62 based on control program P1 with learning model M1 to output the second information. In a case where, for example, the period for replacing the element 40 is learned in the learning mode, the artificial intelligence processor 64 receives the first information to update learning model M1. Then, after the user replaces the element 40, the user operates the operation device 46 and the external device or the like to end the learning mode. In a case where, for example, the period for performing maintenance on the element 40 is learned in the learning mode, the artificial intelligence processor 64 receives the first information to update learning model M1. Then, after the user performs maintenance on the element 40, the user operates the operation device 46 and the external device or the like to end the learning mode.

DESCRIPTION OF REFERENCE CHARACTERS 10) human-powered vehicle; 12A) crankshaft; 12B) crank arm; 14A, 15A) wheel; 14B, 15B) hub; 14C, 15C) rim; 14D, 15D) spokes; 14E, 15E) tire; 18) pedal; 22A, 24A) sprocket; 26A) chain; 28) battery; 30) human-powered vehicle component; 32) transmission; 34) drive device; 40) element; 40A) friction member; 40B) brake pad; 40C) hose; 40D) disc brake rotor; 42) brake device; 44) lamp; 46) operation device; 48) suspension; 50) adjustable seatpost; 60) information processing device, 62) input device; 64) artificial intelligence processor; 66) notification device; 68) controller; 70) first detector; 72) second detector; 74) third detector; 76) fourth detector; 78) fifth detector

The invention claimed is:
1. An information processing device comprising:
an input device to which first information related to a human-powered vehicle is input;
a processor that executes an artificial intelligence model to generate second information related to at least one of deterioration, wear, and failure of an element of the human-powered vehicle from history information of the first information input to the input device; and
a controller configured to control at least one of a human-powered vehicle component that includes the element and a human-powered vehicle component that does not include the element in accordance with the second information, wherein
the element of the human-powered vehicle is included in a brake device and includes a friction member to brake the human-powered vehicle,
the first information includes information related to operation of the friction member and information related to deceleration of the human-powered vehicle to generate the second information,
the controller controls at least one of the element and the human-powered vehicle component in a first control state and a second control state in which at least one of usage frequency and actuation strength of the at least one of the element and the human-powered vehicle component is decreased from that of the first control state, and in a case where the processor determines that the element has entered a second deterioration state or a second wear state, the controller shifts from the first control state to the second control state.

2. The information processing device according to claim 1, further comprising a notification device configured to issue a notification of the second information.

3. The information processing device according to claim 2, wherein in a case where the processor determines that the element has entered a first deterioration state or a first wear state, the notification device issues the notification of the second information.

4. The information processing device according to claim 1, wherein the second information includes information prompting at least one of replacement of the element and maintenance of the element.

5. The information processing device according to claim 1, wherein the second information includes information related to an appropriate period for performing at least one of replacement of the element and maintenance on the element.

6. The information processing device according to claim 1, wherein the history information includes information related to a change in the first information and information related to at least one of the usage frequency of the element and usage time of the element.

7. The information processing device according to claim 1, wherein the element further includes at least one of a brake pad, a brake shoe, a hose, a disc brake rotor, oil, grease, a cable, a sprocket, a chain, a lamp, a transmission, an operation device, a wheel, a hub, a rim, a spoke, a tire, a bottom bracket, a crankshaft, a crank arm, a pedal, a handle grip, a generator, a suspension, an adjustable seatpost, a battery, and a drive device applying propulsion force to the human-powered vehicle.

8. The information processing device according to claim 1, wherein the first information includes information related to a braking distance of the human-powered vehicle.

9. The information processing device according to claim 8, wherein the friction member includes at least one of a brake pad and a brake shoe.

10. The information processing device according to claim 1, wherein the first information includes the information related to speed of the human-powered vehicle.

11. The information processing device according to claim 10, further comprising:
a first detector configured to detect the operation of the friction member; and
a second detector that configured to detect at least one of the deceleration of the human-powered vehicle, position of the human-powered vehicle, and the speed of the human-powered vehicle.

12. The information processing device according to claim 11, wherein
the first detector is provided on at least one of an operation device for operating the friction member, a cable for operating the friction member, and a hose for operating the friction member, and
the first detector is configured to output a signal corresponding to a force input to the operation device.

13. The information processing device according to claim 8, wherein the first information includes information related to a state of the friction member.

14. The information processing device according to claim 13, further comprising:
a third detector configured to detect contact of the friction member with a braking subject; and
a fourth detector configured to detect the deceleration of the human-powered vehicle.

15. The information processing device according to claim 8, wherein
the friction member is configured to be movable between an initial position where the friction member is separated from a braking subject and a contact position where the friction member can contact the braking subject, and
the first information includes the initial position and the contact position.

16. The information processing device according to claim 15, further comprising a fifth detector that detects the initial position and the contact position.

17. The information processing device according to claim 1, wherein the first information includes information related to a usage environment of the element.

18. The information processing device according to claim 1, wherein the human-powered vehicle component includes at least one of a transmission and a drive device that applies propulsion force to the human-powered vehicle.

19. The information processing device according to claim 1, wherein the processor executing the artificial intelligence model is provided on the human-powered vehicle.

* * * * *